(No Model.)
F. J. DE ANDRADE.
VELOCIPEDE FRAME.
No. 594,147. Patented Nov. 23, 1897.
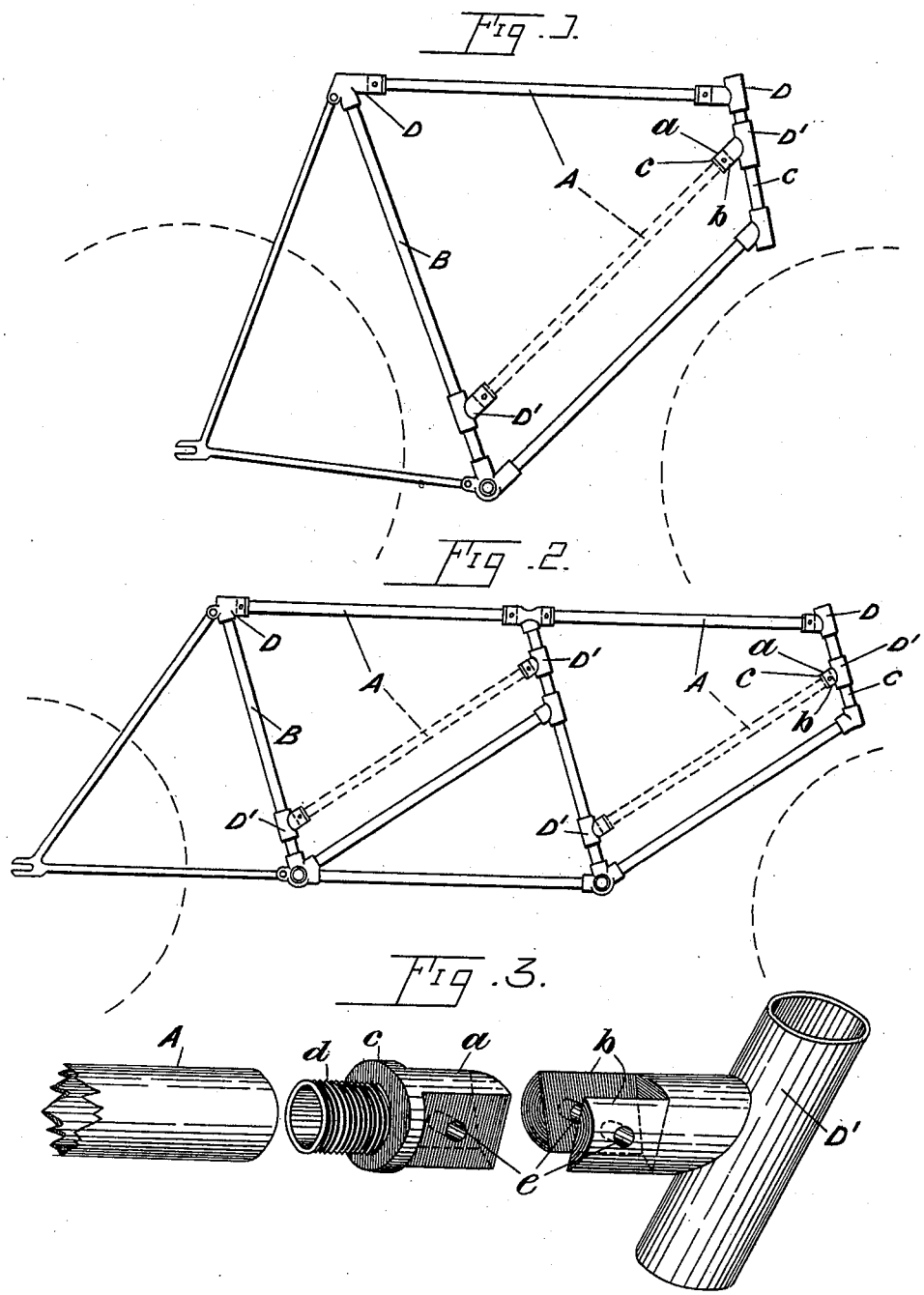
WITNESS:
INVENTOR
Felix Joaquin de Andrade
By Richard...
Att'ys

UNITED STATES PATENT OFFICE.

FELIX JOAQUIN DE ANDRADE, OF LIVERPOOL, ENGLAND.

VELOCIPEDE-FRAME.

SPECIFICATION forming part of Letters Patent No. 594,147, dated November 23, 1897.

Application filed December 29, 1896. Serial No. 617,324. (No model.)

*To all whom it may concern:*

Be it known that I, FELIX JOAQUIN DE ANDRADE, a subject of the Queen of Great Britain and Ireland, residing at 26 Chetwynd Street, St. Michael's Hamlet, Liverpool, England, have invented certain new and useful Improved Velocipede-Frames, of which the following is a specification.

This invention relates to means of adapting the ordinary "diamond" frame of bicycles and other velocipede-frames constructed on the same or an equivalent principle to the service of either a lady or a gentleman; and it consists in constituting the upper horizontal member of such frame removable and capable of occupying two distinct positions in the frame.

In the accompanying drawings, Figure 1 shows the application of my invention to a diamond-frame bicycle, and Fig. 2 shows its application to a "tandem" bicycle. Fig. 3 is a detail view of the removable member of the frame and its fittings.

I attach the upper horizontal member A of a diamond frame to its adjacent members B and C in the manner shown in detail in Fig. 3—namely, by the beveled tongue-pieces $a$, carried by the member A, which ship between two internally-beveled cheeks $b$, formed in each of the four couplings D D D' D', carried by the members B and C. The tongues $a$ have each an abutment-collar $c$ and a stem $d$, which latter screws into the tubular member A. The tongues $a$ may be secured in the cheeks $b$ by either a split pin or a small bolt and nut, which passes through the apertures $e$. The screw-threading of the stems $d$ is preferably right and left handed at opposite ends of the member A, so that by turning the latter the frame is knit or drawn together. In other cases the member A and stems $d$ may be brazed together.

Fig. 2 shows the application of my invention to a tandem bicycle, and as the parts above described are only multiplied the figure needs no further description.

To adapt the frames shown in Figs. 1 and 2 to ladies' use, the member A is unshipped from its upper position (shown in full lines) by removing the split pins or bolts from the cheeks $b$. The member A and its tongues $a$ are then lifted out of the upper couplings D D and placed in the lower couplings D' D', thus assuming the position shown in dotted lines in each figure, where they are secured by reinserting the split pins or bolts in the cheeks $b$ of such lower couplings, and, if necessary, revolving the member A upon its right and left hand threaded tongue-stems $d$.

In the case of the tandem bicycle one member A may remain in its upward position and the other member A may be removed to its lower position when the bicycle is ridden by a lady and gentleman.

It will be seen that my invention provides for the adaptation of a bicycle to either a lady or a gentleman's use in a simple manner and at the same time utilizing all the members of the frame for the purpose of strengthening the frame.

Although I have described the application of this invention to single and tandem bicycle frames only, it must be understood that the invention is equally applicable to the frames of tricyles and other velocipedes constructed on the diamond or equivalent principle.

I am aware that it has heretofore been proposed to constitute the upper member of a diamond frame removable for ladies' use, but where this has been done the said member is discarded and the frame is consequently weakened, and it has not, so far as I am aware, been proposed to remove such member to another position in the frame, so as to utilize it for strenghtening the latter when used by ladies, as is done in my present invention.

Having now described my invention, I claim as new and desire to secure by Letters Patent—

In a cycle, a frame-bar and coupling comprising the member A the second member $b$ having a vertical dovetail socket axially in line with the member A and the coupling-piece between the member A and the socket consisting of the screw-threaded shank at one end, and the dovetail portion tapered vertically at the other end and adapted to the dovetail socket with the cross-pin uniting the dovetail parts, substantially as described.

In witness whereof I have hereunto set my hand in presence of two witnesses.

FELIX JOAQUIN DE ANDRADE.

Witnesses:
HENRY CLAY,
JAMES A. CONBROUGH.